(12) United States Patent
Lee et al.

(10) Patent No.: US 10,599,606 B2
(45) Date of Patent: Mar. 24, 2020

(54) 424 ENCODING SCHEMES TO REDUCE COUPLING AND POWER NOISE ON PAM-4 DATA BUSES

(71) Applicant: NVIDIA Corp., Santa Clara, CA (US)

(72) Inventors: Donghyuk Lee, Cedar Park, TX (US); James Michael O'Connor, Austin, TX (US); John Wilson, Wake Forest, NC (US)

(73) Assignee: NVIDIA Corp., Santa Clara, CA (US)

(*) Notice: Subject to any disclaimer, the term of this patent is extended or adjusted under 35 U.S.C. 154(b) by 0 days.

(21) Appl. No.: 16/360,212

(22) Filed: Mar. 21, 2019

(65) Prior Publication Data
US 2019/0303340 A1  Oct. 3, 2019

Related U.S. Application Data

(60) Provisional application No. 62/650,168, filed on Mar. 29, 2018.

(51) Int. Cl.
| | | |
|---|---|---|
| G06F 3/00 | (2006.01) | |
| G06F 13/42 | (2006.01) | |
| H04L 25/49 | (2006.01) | |
| G06F 13/40 | (2006.01) | |

(52) U.S. Cl.
CPC ...... *G06F 13/4282* (2013.01); *G06F 13/4072* (2013.01); *H04L 25/4917* (2013.01)

(58) Field of Classification Search
CPC .......................... G06F 13/4282; H04L 25/4917
See application file for complete search history.

(56) References Cited

U.S. PATENT DOCUMENTS

| | | | |
|---|---|---|---|
| 4,739,323 A | 4/1988 | Miesterfeld et al. | |
| 4,742,349 A | 5/1988 | Miesterfeld et al. | |
| 5,377,020 A | 12/1994 | Smitt | |
| 5,572,736 A | 11/1996 | Curran | |
| 6,285,300 B1 | 9/2001 | Colon-Bonet | |
| 6,604,120 B1 | 8/2003 | De | |
| 7,149,955 B1 | 12/2006 | Sutardja et al. | |
| 7,188,263 B1 | 3/2007 | Rubinstein et al. | |
| 7,620,116 B2 | 11/2009 | Bessios et al. | |
| 8,022,726 B2 * | 9/2011 | Candage | H02M 3/1584 323/272 |
| 8,181,101 B2 | 5/2012 | Shen et al. | |
| 8,359,498 B1 | 1/2013 | Sutardja et al. | |
| 8,984,380 B2 | 3/2015 | Vijayaraghavan et al. | |
| 9,184,906 B1 | 11/2015 | Min et al. | |
| 9,231,704 B1 | 1/2016 | Zhou et al. | |

(Continued)

FOREIGN PATENT DOCUMENTS

DE   102019108205 A1   10/2019

OTHER PUBLICATIONS

"AN 835—PAM4 Signaling Fundamentals" by Intel, Mar. 12, 2019 (Year: 2019).*

(Continued)

*Primary Examiner* — Jing-Yih Shyu
(74) *Attorney, Agent, or Firm* — Rowan TELS LLC

(57) ABSTRACT

Methods of operating a serial data bus generate two-level bridge symbols to insert between four-level symbols on one or more data lanes of the serial data bus, to reduce voltage deltas on the one or more data lanes during data transmission on the serial data bus.

20 Claims, 10 Drawing Sheets

(56) References Cited

U.S. PATENT DOCUMENTS

| | | | |
|---|---|---|---|
| 9,240,907 B2 | 1/2016 | Wang | |
| 9,244,763 B1 | 1/2016 | Kankani et al. | |
| 9,548,858 B1 | 1/2017 | Cirit et al. | |
| 9,564,990 B1 | 2/2017 | Tiruvur et al. | |
| 9,853,769 B1 | 12/2017 | Farjad et al. | |
| 9,942,063 B2* | 4/2018 | Mendel | H04L 25/08 |
| 10,312,896 B2 | 6/2019 | Kim et al. | |
| 2003/0035497 A1* | 2/2003 | Gorecki | H04L 25/4917 375/317 |
| 2003/0108134 A1* | 6/2003 | Stonick | H04B 3/32 375/353 |
| 2004/0114692 A1 | 6/2004 | Matsumoto | |
| 2005/0086417 A1 | 4/2005 | Meyer et al. | |
| 2005/0089126 A1 | 4/2005 | Zerbe et al. | |
| 2006/0109917 A1 | 5/2006 | Fonseka et al. | |
| 2006/0139186 A1* | 6/2006 | Hoyer | H04L 25/4908 341/50 |
| 2006/0280272 A1 | 12/2006 | Stojanovic | |
| 2007/0203962 A1 | 8/2007 | Hirairi | |
| 2008/0181331 A1 | 7/2008 | Casper et al. | |
| 2008/0262855 A1 | 10/2008 | Mehrotra et al. | |
| 2009/0193319 A1 | 7/2009 | Shen et al. | |
| 2009/0323722 A1 | 12/2009 | Sharma | |
| 2010/0174844 A1 | 7/2010 | Chu | |
| 2010/0299440 A1 | 11/2010 | Meyer et al. | |
| 2011/0264719 A1 | 10/2011 | Mortensen | |
| 2012/0110255 A1 | 5/2012 | Meyer et al. | |
| 2012/0144161 A1 | 6/2012 | Elliott | |
| 2012/0204082 A1 | 8/2012 | Shen et al. | |
| 2012/0206280 A1 | 8/2012 | Abbasfar et al. | |
| 2012/0250746 A1 | 10/2012 | Sonntag | |
| 2013/0226982 A1 | 8/2013 | Yu | |
| 2014/0153620 A1* | 6/2014 | Longo | H04L 25/4917 375/219 |
| 2014/0173296 A1 | 6/2014 | Muff et al. | |
| 2014/0281075 A1 | 9/2014 | Hollis | |
| 2014/0298458 A1 | 10/2014 | Lewis et al. | |
| 2014/0358979 A1 | 12/2014 | Singh | |
| 2015/0137789 A1 | 5/2015 | Furtner | |
| 2015/0235634 A1 | 8/2015 | Liu et al. | |
| 2016/0013958 A1 | 1/2016 | Mishra et al. | |
| 2016/0164705 A1 | 6/2016 | Whitby-Strevens | |
| 2016/0173134 A1 | 6/2016 | Kwon et al. | |
| 2016/0373557 A1 | 12/2016 | Sikkink et al. | |
| 2017/0075854 A1 | 3/2017 | Hollis | |
| 2017/0207908 A1 | 7/2017 | Cirit et al. | |
| 2017/0220518 A1 | 8/2017 | Sengoku et al. | |
| 2017/0310529 A1 | 10/2017 | Yang et al. | |
| 2017/0373887 A1* | 12/2017 | Ho | H04L 25/03057 |
| 2018/0091189 A1* | 3/2018 | Chada | H04B 3/04 |
| 2018/0091335 A1* | 3/2018 | Schnizler | H04L 25/4917 |
| 2019/0199560 A1* | 6/2019 | Bossard | H04L 1/0055 |
| 2019/0303340 A1 | 10/2019 | Lee et al. | |
| 2019/0305995 A1 | 10/2019 | Lee et al. | |

OTHER PUBLICATIONS

"Low-Power Bus Transform Coding for Multilevel Signals" by Fakhrul Zaman Rokhani and Gerald E. Sobelman, APCCAS 2006 (Year: 2006).*

"100Gbps Dual-Channel PAM4 Transmission over Datacenter Interconnects" by Khandelwal et al. DesignCon 2016 (Year: 2016).*

"Space Coding Applied to High-Speed Chip-To-Chip Interconnects" by Kamran Farzan, PhD Thesis, 2004 (Year: 2004).*

U.S. Appl. No. 16/557,637, filed Aug. 30, 2019, Sunil Sudhakaran.

Hossain et al, Channel-Adaptive ADC and TDC for 28 Gb/s PAM-4 Digital Receiver.

Im et al, A 40-to-56 Gb/s PAM-4 Receiver With Ten-Tap Direct Decision-Feedback Equalization in 16-nm FinFET.

P. S. Teja, "Design of Radix-8 Booth Multiplier Using Koggestone Adder for High Speed Arithmetic Applications," Emerging Trends in Electrical, Electronics & Instrumentation Engineering: An international Journal (EEIEJ), vol. 1, No. 1, Feb. 2014 (Year: 2014).

Pupalaikis et al, Designcon 2017, Inphi, 2017, (Year: 2017).

S. Samavi, "High Radix Multipliers," Jan. 2014, retrieved from https://www.researchgate.net/publication/262836009 (Year: 2014).

Zhang et al, PAM4 Signalling for 56G Serial Link Applications—A Tutorial (Year: 2016).

* cited by examiner

| FIRST 4-LEVEL SYMBOL | SECOND 4-LEVEL SYMBOL | INSERT BUFFER? | 2-LEVEL BRIDGE SYMBOL |
|---|---|---|---|
| L3 | L0 | Y | L1 OR L2 |
| L3 | NOT L0 | N | N/A |
| L0 | L3 | Y | L1 OR L2 |
| L0 | NOT L3 | N | N/A |
| L1 OR L2 | ANY | N | N/A |

FIG. 5

| FIRST 4-LEVEL SYMBOL | NEXT 4-LEVEL SYMBOL | INSERT BUFFER? | 2-LEVEL BRIDGE SYMBOL |
|---|---|---|---|
| L3 | L0 OR L1 | Y | L1 OR L2 |
| L3 | L2 OR L3 | N | N/A |
| L0 | L2 OR L3 | Y | L1 OR L2 |
| L0 | L0 OR L1 | N | N/A |
| L1 OR L2 | ANY | N | N/A |

FIG. 8

424 ENCODING SCHEMES TO REDUCE COUPLING AND POWER NOISE ON PAM-4 DATA BUSES

CROSS REFERENCE TO RELATED APPLICATIONS

This application claims the benefit of U.S. provisional patent application Ser. No. 62/650,168, filed on Mar. 29, 2018, the contents of which are incorporated herein by reference in their entirety.

BACKGROUND

Modern high throughput systems utilize multiple high bandwidth input/output interfaces to form a signaling network between compute units, memory devices, and storage devices. For example, Peripheral Component Interconnect Express (PCI-E) connects multiple periphery devices to central processing units (CPUs) and graphics processing units (GPUs). These interfaces may comprise multiple serial data buses that operate at high frequency.

Pulse amplitude modulation (PAM) may be utilized on a multi-lane serial data bus to transfer multiple bits of data simultaneously by encoding the data as different voltage levels. Here, "lane" refers to a single wire of a serial data bus. A "data burst" refers to bits placed on the data lanes of a serial data bus in a same bus clock interval, i.e., in parallel.

An example of PAM communication is PAM-4. During each bus clock interval, PAM-4 encodes two bits of data (00, 01, 10, 11) on each data lane of a serial data bus as one of four different voltage levels (symbols). Because two bits are encoded into each bus clock interval on each data lane, PAM-4 ideally enables twice the bandwidth compared to conventional two-level (e.g., PAM-2) signaling on serial data buses operating at comparable bus clock frequencies. PAM-4 symbols utilize four different voltage levels and therefore there is less voltage-level distinction between symbol values in PAM-4 compared to PAM-2. This makes PAM-4 communications more vulnerable to interference effects such as coupling noise between data lanes on a serial data bus, and power supply noise, which reduces the signal to noise ratio (SNR).

One mechanism to mitigate these noise effects is to utilize Data Bus Inversion (DBI). For a given data burst, DBI reduces the total extent of voltage level transitions across the data lanes of a serial data bus by up to half by intelligently setting the polarity of the bits in each data burst on the serial data bus. DBI requires an additional metadata bit per data burst to transfer the data burst polarity setting (non-inverted data burst, or inverted data burst) to the receiver. This metadata bit is often transmitted on an extra wire that is separate from the data lanes (each also one wire, typically) of the serial data bus.

Many serial data buses comprise only a single data lane between the transmitter and the receiver. Adding an additional metadata wire can thus result in up to 100% overhead in the number of wires required for the serial data bus.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates a conditional PAM-424 encoding logic 500 in accordance with one embodiment.

FIG. 8 illustrates a conditional PAM-424 encoding logic 800 in accordance with one embodiment.

DETAILED DESCRIPTION

Figure 1:
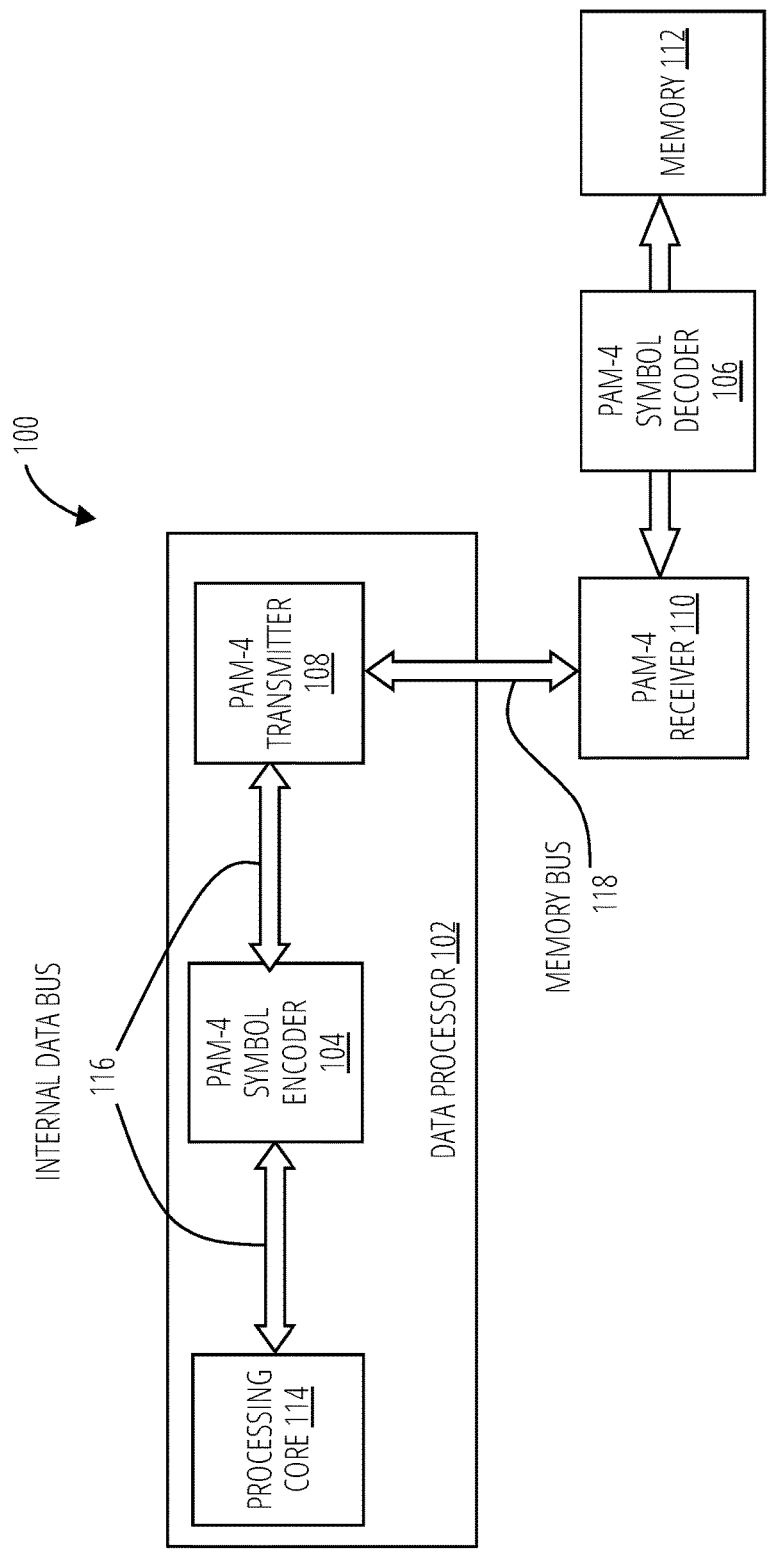
FIG. 1 illustrates a data communication system 100 in accordance with one embodiment.

Referring to FIG. 1, a data communication system 100 comprises a transmitting device such as a data processor 102 that includes a processing core 114, PAM-4 symbol encoder 104, and a PAM-4 transmitter 108. The data processor 102 may in some embodiments comprise a graphics processing unit (GPU), a central processing unit (CPU), a system on a chip (SoC), or other well-known data processing devices.

The data processor 102 communicates with a receiving device such as a memory 112 over a bus such as a memory bus 118. A PAM-4 receiver 110 and PAM-4 symbol decoder 106 receive and process PAM-4 signals communicated from the data processor 102 to the memory 112 over the memory bus 118.

The data processor 102 utilizes an internal data bus 116 to transmit data bursts to and from the processing core 114 over a multi-lane internal data bus 116. The PAM-4 symbol encoder 104 receives a burst of data to encode from the processing core 114 and performs PAM-4 encoding on that burst. The PAM-4 transmitter 108 interfaces the PAM-4 symbol encoder 104 to the memory bus 118 or another serial data bus and transmits the encoded burst to the PAM-4 receiver 110 via the memory bus 118. The PAM-4 receiver 110 receives the encoded burst and sends the encoded burst to the PAM-4 symbol decoder 106 to decode the burst. Once decoded, the burst is sent to the memory 112.

This is a simplified diagram. In practice, there would typically be encoders and decoders on both ends of the memory bus 118 for both writing to and reading from the memory 112.

Figure 2:
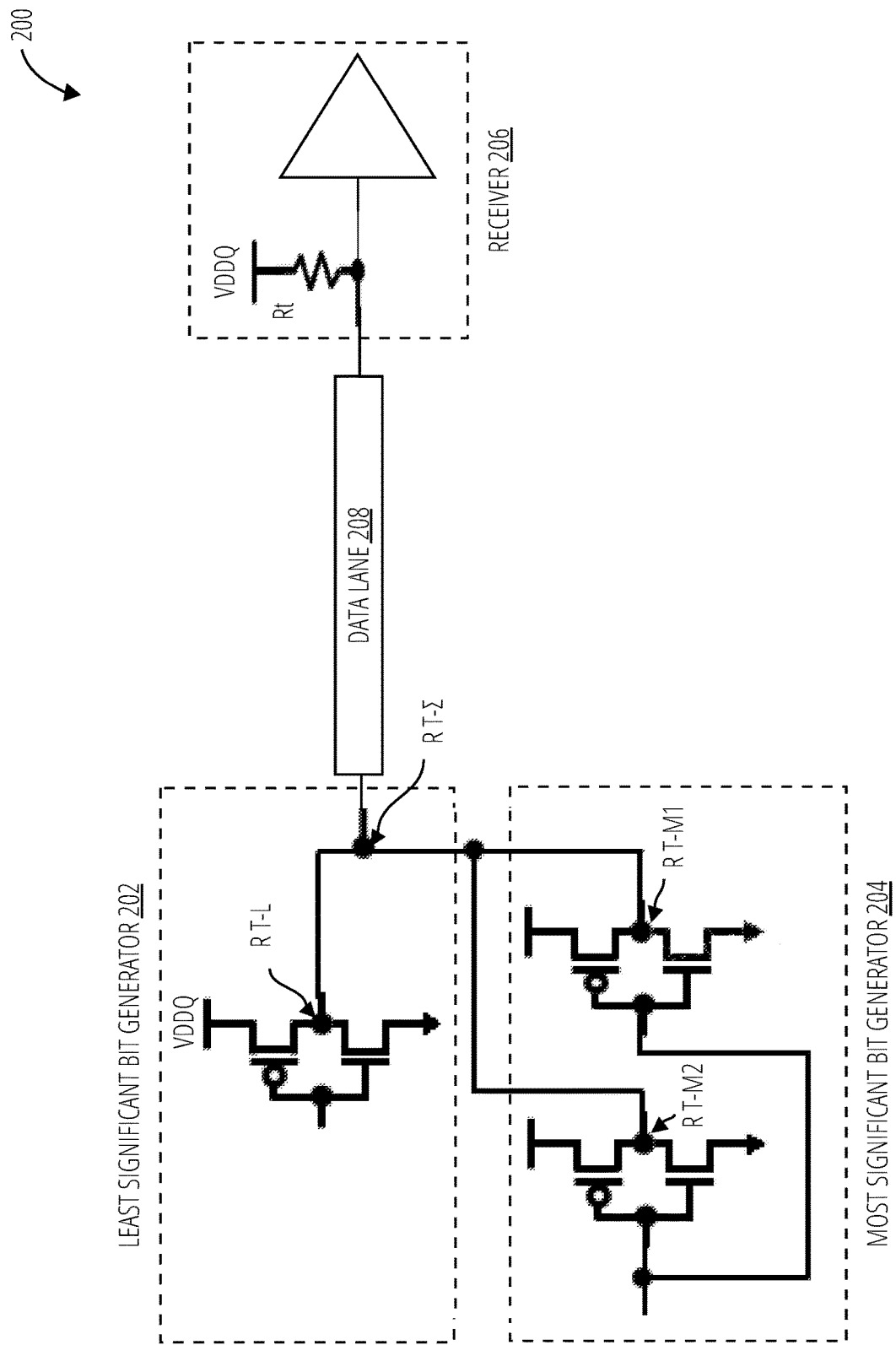
FIG. 2 illustrates an embodiment of a PAM-4 transceiver 200.

FIG. 2 illustrates a PAM-4 transceiver 200 for a single data lane of a serial data bus in one embodiment. The PAM-4 transceiver 200 comprises a least significant bit transmitter 202, a most significant bit transmitter 204, a receiver 206, and a data lane 208. The PAM-4 transceiver 200 utilizes the least significant bit transmitter 202 and the most significant bit transmitter 204 to generate a four-level symbol on the data lane 208. Herein the term "symbol" refers to a voltage level generated by a line driver on a serial data bus data lane, where the voltage level represents the value of one or more bits of data. Thus "encoding a symbol" means physically configuring a line driver circuit of the serial data bus to drive the voltage on the data lane to a particular value.

For example, if the two-bits of data to encode into the symbol are (1,1), the outputs of the least significant bit transmitter 202 and most significant bit transmitter 204 combine to generate a voltage of, e.g., 1.2 Von the data lane 208 and current on the data lane 208 is, e.g., 0 mA due to the pull-up transistor Rt at the receiver 206 (both ends of the data lane 208 are at the same potential). If the two-bits of data to encode into the symbol are (1,0), the outputs of the least significant bit transmitter 202 and most significant bit transmitter 204 combine to generate a voltage of, e.g., 1.0 V on the data lane 208 and current on the data lane 208 is, e.g., 5 mA. If the two-bits of data to encode into the symbol are (0,1), the outputs of the least significant bit transmitter 202 and most significant bit transmitter 204 combine to generate a voltage of, e.g., 0.8 V on the data lane 208 and current on the data lane 208 is, e.g., 10 mA. If the two-bits of data to encode into the symbol are (0,0), the outputs of the least significant bit transmitter 202 and most significant bit transmitter 204 combine to generate a voltage of, e.g., 0.6 V on the data lane 208 and current on the data lane 208 is, e.g., 15 mA. The 0.6V may be referred to herein as the base transmission voltage $V_b$ from which the other symbol voltage levels are delta-ed.

The symbol value on a data lane therefore corresponds to the current consumption of that data lane during a data burst. Weights may therefore be assigned to the symbol values reflecting their current consumption cost. For example, a weight of 0 may be assigned to the symbol for the bit pair (1,1); a weight of 1 may be assigned for the symbol for the bit pair (1,0); a weight of 2 may be assigned to the symbol for the bit pair (0,1); and a weight of 3 may be assigned for the symbol for the bit pair (0,0).

In this example, a data burst on an eight lane serial data bus utilizing PAM-4 encoding may be assigned a total weight that ranges from 0 to 24, which equates to a current consumption range of, e.g., 0 to 120 mA. The total weight for the data burst would be 0 if all the symbols in the data burst each encoded the bit pair (1,1), and the total weight for the data burst would be 24 if all the symbols in the data burst each encoded the bit pair (0,0). Data bursts comprising all 0's consume the most current, hence are the most expensive from a power consumption standpoint.

Figure 3:
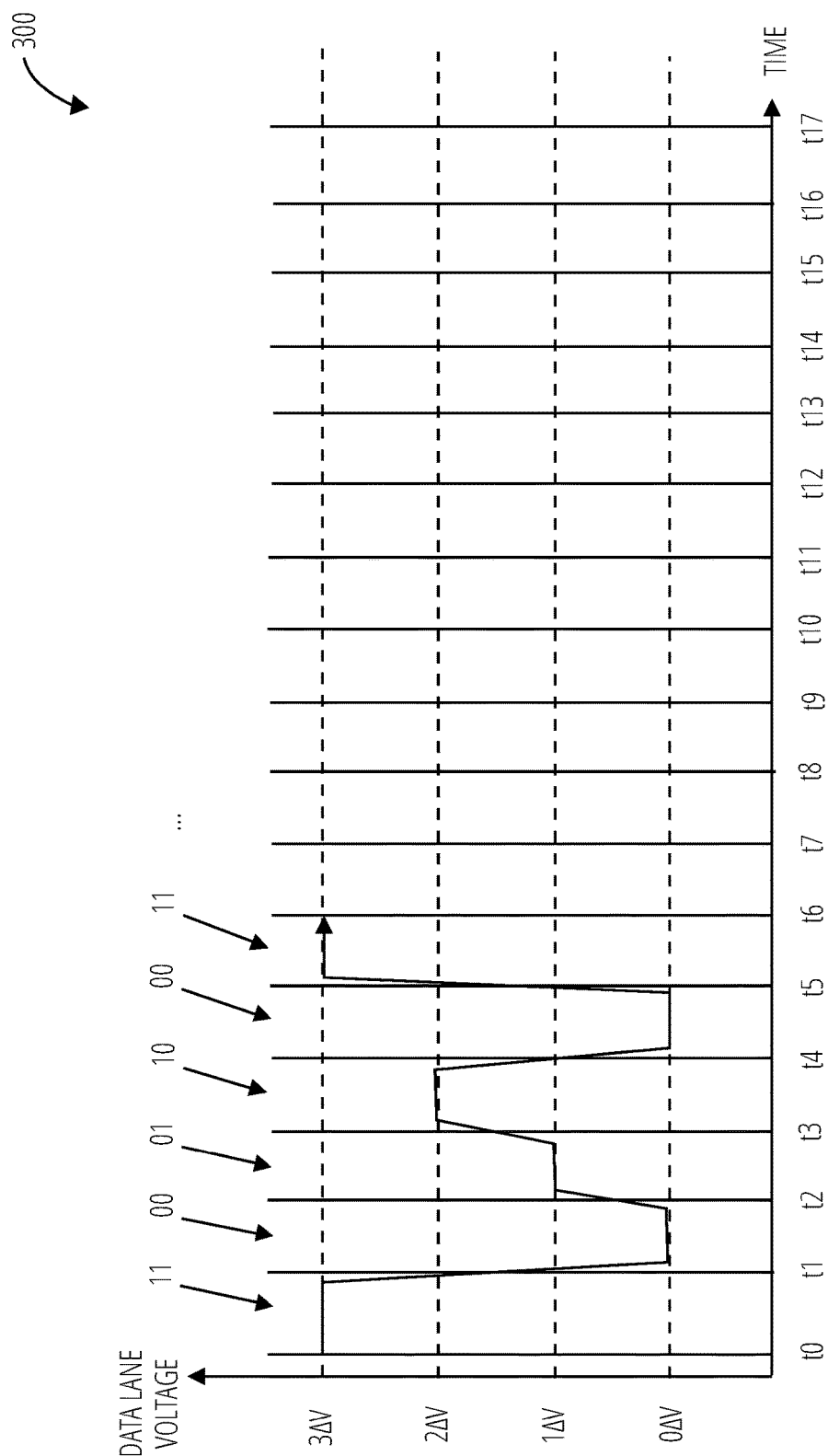
FIG. 3 illustrates an embodiment of a conventional PAM-4 data lane voltage waveform 300.

Referring to FIG. 3, a conventional PAM-4 data lane voltage waveform 300 encodes two bits of data on the data lane per clock interval by utilizing all 4-level symbols. An exemplary sequence of 12 bits is 110001100011. This sequence may be transferred as a series of four-level symbols each encoding two bits. For the bit sequence 110001100011, the bits 11 are encoded into the first serial data bus clock interval t0-t1; the next two bits 00 are encoded into the second serial data bus clock interval t1-t2; and so on. This results in two 3ΔV voltage level changes on the serial data bus from t0-t1 and from t4-t5.

The notation nΔV refers to a voltage change of n-deltas from the base voltage $V_b$ on a data lane of a serial data bus between clock intervals. For example, referring back to FIG. 2 in which different symbols have a 0.2V separation and the base voltage $V_b$ is 0.6V, a 3ΔV change would correspond to 3×0.2V or a 0.6V delta in voltage on the data lane between bus clock cycles.

Higher voltage deltas generate more noise because they lead to higher current swings in the data lane. Thus in FIG. 3 the 3ΔV deltas between bus clock intervals t0 and t1, and again between t4 and t5, may generate significant noise. Mitigating this maximum delta voltage activity helps to improve the SNR of a PAM-4 system such as the PAM-4 transceiver 200.

Figure 4:
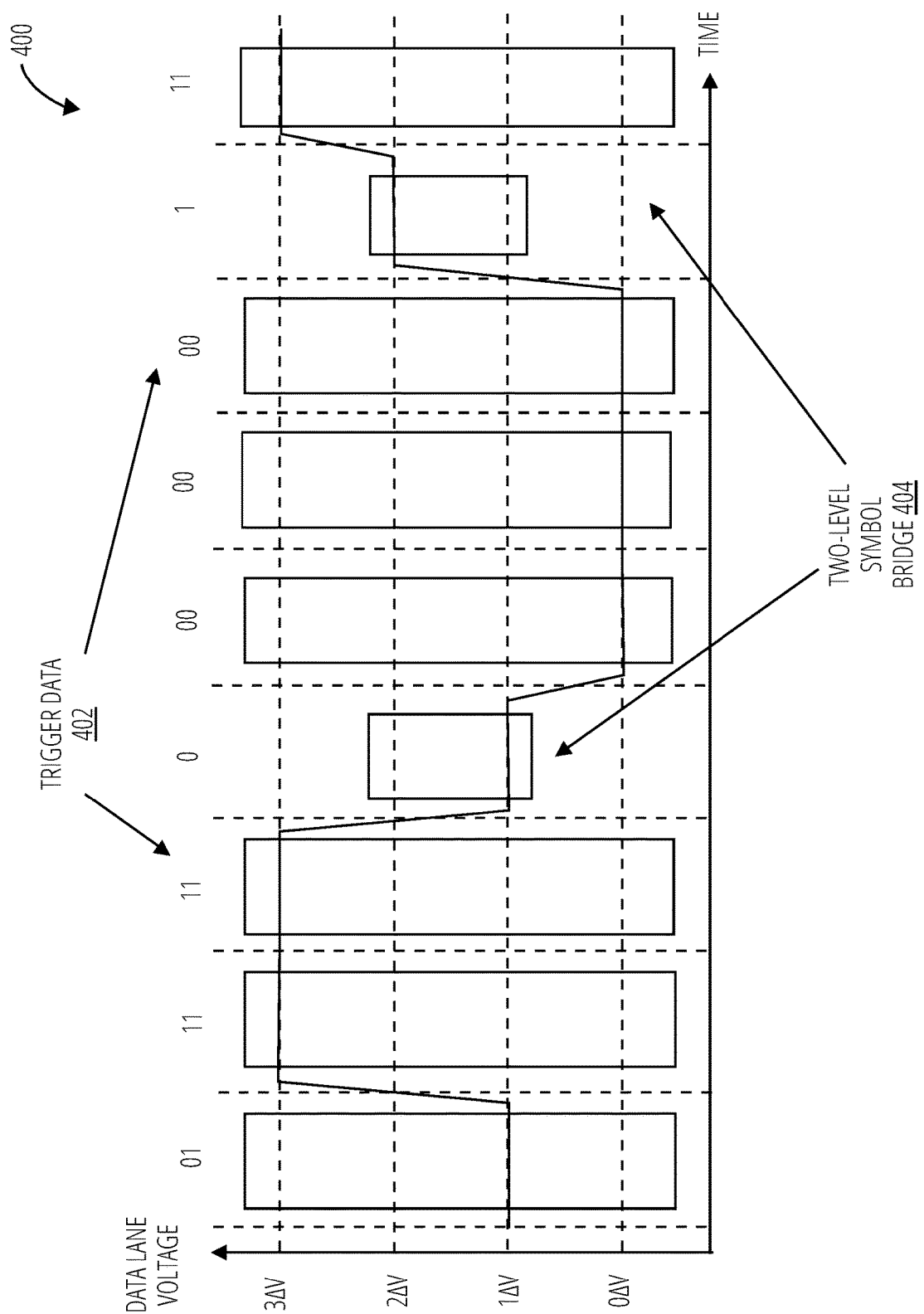
FIG. 4 illustrates an embodiment of a conditional PAM-424 encoding 400.

Referring to FIG. 4, a conditional PAM-424 encoding 400 operates a serial data bus to utilize a two-level symbol bridge 404 that selectively encodes a two-level symbol on a data lane of the serial data bus. The two-level symbol acts as a bridge between two four-level symbols and encodes one bit of data using one of the two middle voltage levels 1ΔV and 2ΔV of a four-level symbol. The voltage delta transitioning to and from the two-level symbol bridge 404 from the bracketing four-level symbols is at most 2ΔV.

The conditional PAM-424 encoding 400 operates a serial data bus to encode this transition symbol after the trigger data 402 on condition of the following: 1) the current symbol encodes on the serial data bus as either 0ΔV or 3ΔV, and 2) the symbol immediately subsequent to the current symbol encodes on the serial data bus as either 3ΔV or 0ΔV. The serial data bus voltage levels 0ΔV and 3ΔV are referred to herein as the "extremes" of the voltages that the serial data bus may be driven to during PAM communication.

FIG. 5 illustrates conditional PAM-424 encoding logic 500 in one embodiment. When the first two bits of data to encode as a first four-level symbol on the data lane of the serial data bus are "11" this corresponds to a four-level symbol having a 3ΔV encoding on the data lane. For convenience the 3ΔV voltage level is referred to as L3. If the next two bits of data to encode as a second four-level symbol on the data lane of the serial data bus immediately after the first four-level symbol are "00", this corresponds to a four-level symbol having a 0ΔV (i.e., L0) encoding on the data lane. Under these conditions, the two-level symbol bridge 404 is encoded on the data lane between the first four-level symbol and the second four-level symbol at a voltage level of either (a) 1ΔV, i.e. L1, or (b) 2ΔV, i.e. L2. The choice of which encoding option (a) or (b) to use for the inserted two-level symbol bridge 404 is implementation-specific.

When the first two bits of data to encode correspond to a four-level symbol having a 3ΔV encoding on the data lane, but the next two bits of data do not correspond to a four-level symbol having a 0ΔV encoding, the two-level symbol bridge 404 is not encoded on the data lane between the first four-level symbol and the second four-level symbol. Hence the "conditional" nature of the conditional PAM-424 encoding logic 500.

When the first two bits of data to encode as a first four-level symbol on the data lane of the serial data bus are "00" this corresponds to a four-level symbol having a 0ΔV encoding on the data lane. If the next two bits of data to encode as a second four-level symbol on the data lane of the serial data bus immediately after the first four-level symbol are "11", this corresponds to a four-level symbol having a 3ΔV encoding on the data lane. Under these conditions, the two-level symbol bridge 404 is encoded on the data lane between the first four-level symbol and the second four-level symbol at a voltage level of either (a) 1ΔV, i.e. L1, or (b) 2ΔV, i.e. L2. The choice of which encoding option (a) or (b) to use for the inserted two-level symbol bridge 404 is implementation-specific.

This example assumes a choice to encode the bit pair "11" as a symbol at 3ΔV and to encode the bit pair "00" at 0ΔV. However, the conditional PAM-424 encoding logic 500 does not require these particular choices. Any bit pairs may be chosen to correspond to these symbol encoding levels and the technique will generally apply.

Figure 6:
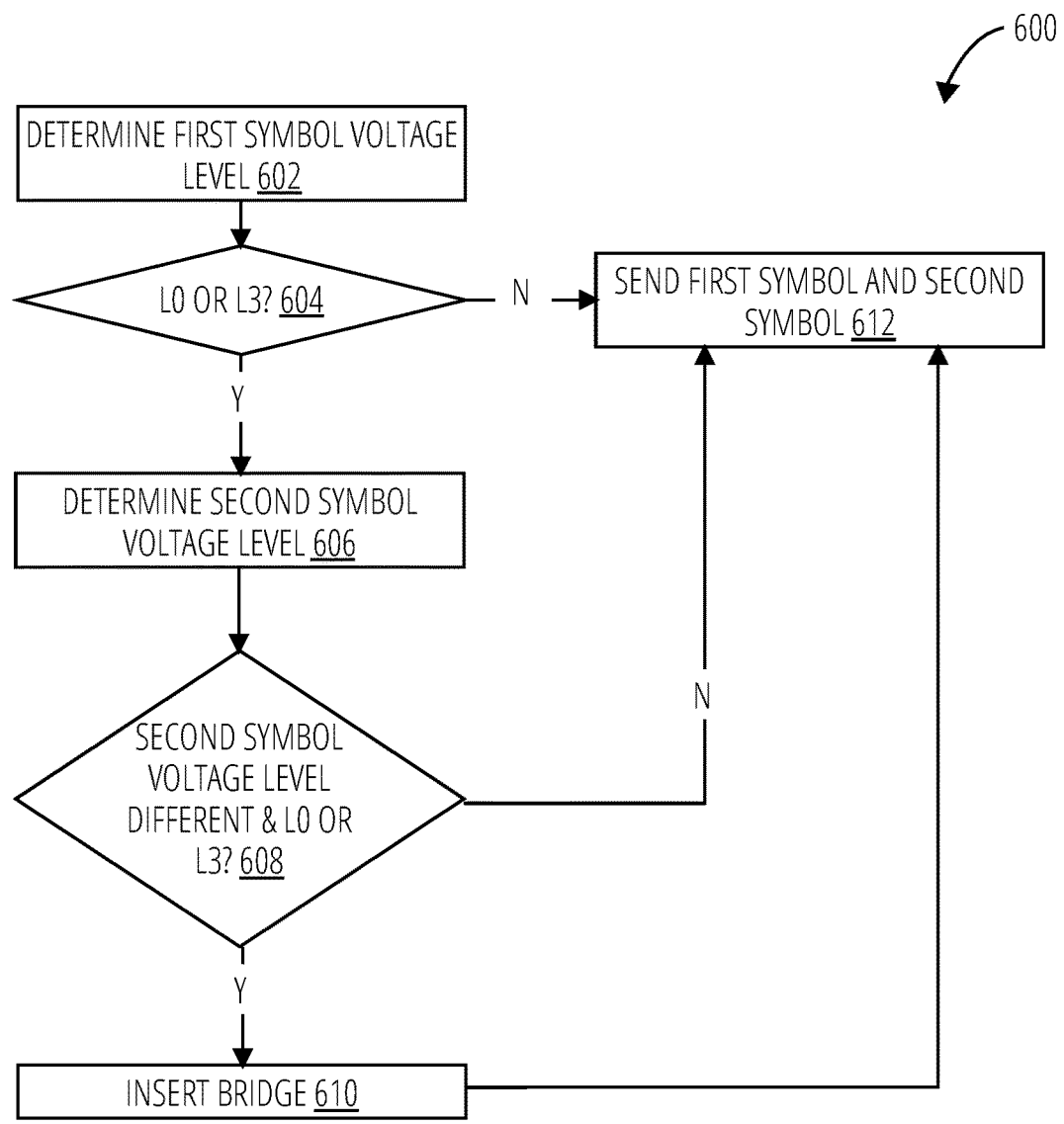
FIG. 6 illustrates an encoding method 600 in accordance with one embodiment.

Referring to FIG. 6, an encoding method 600 determines the corresponding data lane voltage level for a first four-level symbol (block 602). For PAM-4 symbols, the voltage level may be one of L0, L1, L2, and L3, where L0 and L3 are the data lane extreme voltage levels that result from encoding symbols, described earlier. If the encoding method 600 determines that the first symbol will encode to L0 or L3 (decision block 604), the data lane voltage level corresponding to encoding the second four-level symbol is determined (block 606). The encoding method 600 determines whether the voltage delta between the encoded first symbol and encoded second symbol is 3ΔV (decision block 608). If yes, a two-level symbol encoding one-bit is inserted between the current data and the next data (block 610). The first symbol and second symbol are then sent, possibly with the inserted two-level bridge symbol in between (block 612). The use of the bridge to encode one bit of real data (vs a "dummy bit") results in a change to the value of the second symbol. However, this change will not result in a 3ΔV voltage delta on the data lane.

Figure 7:
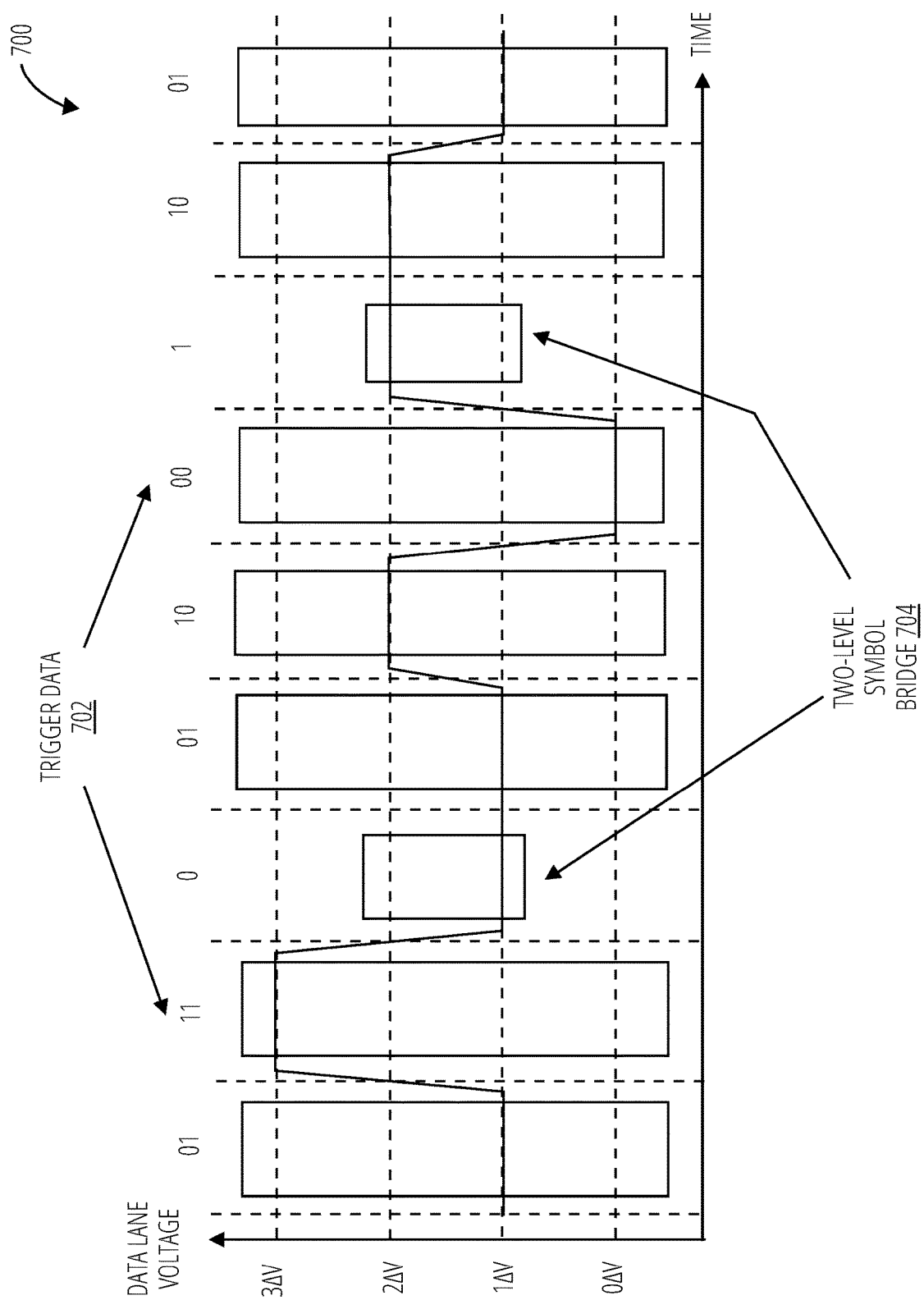
FIG. 7 illustrates an embodiment of a conditional PAM-424 encoding 700.

The encoding method 600 eliminates 3ΔV voltage deltas on the data lane with no requirement for a separate DBI line for the serial data bus and minimal bandwidth penalty for most data patterns to communicate. FIG. 7 illustrates the data lane voltage waveform generated for an embodiment of conditional PAM-424 encoding 700 in which the symbol for the two bits "11" corresponds to a data lane voltage level of L3, and the symbol for the two bits "00" corresponds to a data lane voltage level of L0. Bit patterns that correspond to these symbols are referred to as the trigger data 702 and detection of the trigger data 702 may result in insertion of the two-level symbol bridge 704. Note that in this embodiment the first (most significant) bit of the second pair of bits is encoded in the two-level symbol bridge 704.

Referring to FIG. 8, depicts another embodiment of conditional PAM-424 encoding logic 800. The conditional PAM-424 encoding logic 800 may be relatively simple and low-area to implement as it examines only three sequential bits at a time when determining whether or not to insert a two-level bridge symbol on the data lane of a serial data bus. The conditional PAM-424 encoding logic 800 eliminates 2ΔV voltage deltas on the serial data bus data lane and may also substantially reduce additional voltage deltas on the data lane, with a reasonable tradeoff in bandwidth.

Consider the situation in which the sequence of data to send on the data lane comprises the bits "110111". In this situation the first two bits are "11" and the MSB of the next two bits ("01") is "0". Depending on the implementation, the two-level bridge symbol may encode the "0" MSB of the second bit pair at either 1ΔV (L1) or 2ΔV (L2). Either option eliminates the possibility of a potential 3ΔV voltage delta on the data lane. The second four-level symbol becomes "11". Assuming the implementation encodes the third bit in the sequence (the "0") as a two-level bridge symbol at L2, the symbols that are transmitted on the data lane become: L3 (the first four-level symbol representing "11"), L2 (the two-level bridge symbol representing "0"), and L3 (the second four-level symbol representing "11"). Without applying the conditional PAM-424 encoding logic 800, the symbols encoded on the data lane would all be four-level symbols as follows: L3 (the first four-level symbol representing "11"), L1 (the second four-level symbol representing "01"), and L3 (a third four-level symbol representing "11"). Thus the conventional approach yields two instances of 2ΔV voltage deltas on the data lane for this example bit sequence, whereas the conditional PAM-424 encoding logic 800 yields only a single 1ΔV voltage delta.

A similar process is followed when the first bit pair is "00" and the MSB of the second bit pair is "1". The explanation is similar as for the example above and will not be repeated. The two-level bridge symbol is not generated in other circumstances.

Generally then the conditional PAM-424 encoding logic 800 may insert the two-level bridge symbol when a bit pair encodes at an extreme voltage level of the PAM-4 encoding scheme, and the next two bits to encode would result in more than a one voltage delta on the data lane.

A corresponding receiver and decoder (e.g., PAM-4 receiver 110 and PAM-4 symbol decoder 106) may be configured to recognize the trigger data and when to expect a two-level bridge symbol in the received data. The design of such a receiver/decoder is straightforward in view of this disclosure and need not be elaborated.

Figure 9:
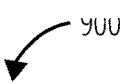
FIG. 9 illustrates a conditional PAM-424 encoding logic 900 in accordance with one embodiment.

FIG. 9 illustrates yet another embodiment of conditional PAM-424 encoding logic 900 in which the voltage level of the symbol chosen for the bridge is made more intelligently based on the level of the second four-level symbol. For example, when the first four-level symbol is L3 and the second four-level symbol (as modified after accounting for encoding one bit of the sequence in the two-level bridge symbol) is L2 (e.g., MSB=1), the conditional PAM-424 encoding logic 900 may set L2 as the level of the two-level bridge symbol. Otherwise, if the second four-level symbol (as modified to account for the two-level bridge symbol) is L1 or L0, L1 may be chosen as the level of the two-level bridge symbol. When the level of the first four-level symbol is L0 and the level of the second four-level symbol (as modified to account for the two-level bridge symbol) is L1 (e.g. MSB=0), L1 may be chosen for the level of the two-level bridge symbol. Otherwise if the second four-level symbol as modified is L2 or L3, L2 may be chosen. This may prove more efficient at eliminating the 3ΔV voltage deltas on the data lane while also reducing lower voltage deltas on the data lane as well. The receiver logic will necessarily be more complex in these embodiments due to needing to analyze more bits to determine what the two-level bridge symbol represents (a "1" or a "0").

Thus a number of embodiments are possible. In one embodiment, the encoder determines if (a) a first symbol for a first sequence of two bits is at a first extreme voltage level of a PAM-4 encoding, and (b) if a second symbol for a second sequence of two bits immediately following the first sequence of two bits is at a second extreme voltage level of the PAM-4 encoding. On the condition that both (a) and (b) are true, the encoder inserts a two-level bridge symbol between the first four-level symbol and the second four-level symbol on the data line of the serial data bus, where the bridge symbol is selected from one of two middle voltage levels of the PAM-4 encoding. The selection may be dynamic based on characteristics of the data or other runtime state, or one of the two middle voltage levels may always be selected.

Another embodiment may be utilized, for example, where a lower data transfer rate is tolerable and it is desirable to reduce the voltage switching even further. In these embodiments, the encoder determines (a) if a sequence of two bits is represented by a first symbol at a highest voltage level or a lowest voltage level of a PAM-4 encoding, and (b) if a second sequence of two bits immediately subsequent to the first sequence of two bits is represented by a second symbol one or more voltage levels different than the voltage level represented by the first symbol. On condition that (a) and (b) are true, the encoder inserts a one-bit bridge symbol between the first symbol and the second symbol, the bridge symbol having a voltage level selected from one of two middle voltage levels of the PAM-4 encoding to minimize a voltage switching rate between the first symbol and the second symbol. Embodiments of this type may eliminate three voltage level switches and many two voltage level switches as well.

The various embodiments described herein may be utilized on multiple data lanes of a serial data bus, either uniformly or in various combinations across the data lanes, according to the requirements of the implementation.

Figure 10:
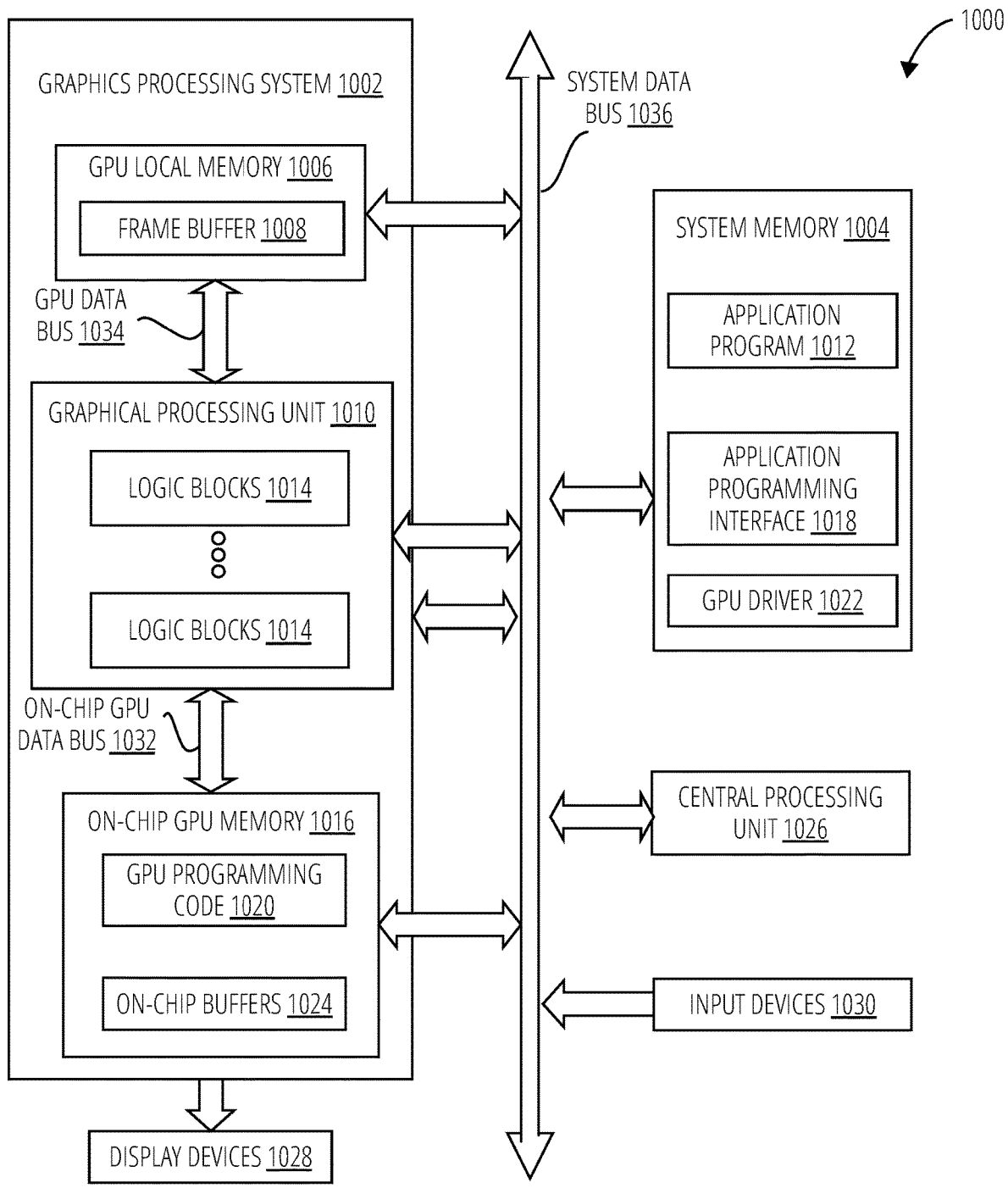
FIG. 10 is a block diagram of a computing system 1000 including a GPU in which aspects of the invention may be embodied or carried out.

FIG. 10 is a block diagram of one embodiment of a computing system 1000 in which one or more aspects of the invention may be implemented. The computing system 1000 includes a system data bus 1036, a CPU 1026, input devices 1030, a system memory 1004, a graphics processing system 1002, and display devices 1028. In alternate embodiments, the CPU 1026, portions of the graphics processing system 1002, the system data bus 1036, or any combination thereof, may be integrated into a single processing unit. Further, the functionality of the graphics processing system 1002 may be included in a chipset or in some other type of special purpose processing unit or co-processor.

As shown, the system data bus 1036 connects the CPU 1026, the input devices 1030, the system memory 1004, and the graphics processing system 1002. In alternate embodiments, the system memory 1004 may connect directly to the CPU 1026. The CPU 1026 receives user input from the input devices 1030, executes programming instructions stored in the system memory 1004, operates on data stored in the system memory 1004, and configures the graphics processing system 1002 to perform specific tasks in the graphics pipeline. The system memory 1004 typically includes dynamic random access memory (DRAM) employed to store programming instructions and data for processing by the CPU 1026 and the graphics processing system 1002. The graphics processing system 1002 receives instructions transmitted by the CPU 1026 and processes the instructions to perform various operations inside the computing system 1000.

As also shown, the system memory 1004 includes an application program 1012, an API 1018 (application programming interface), and a graphics processing unit driver 1022 (GPU driver). The application program 1012 generates calls to the API 1018 to produce a desired set of results. For example, the application program 1012 also transmits programs to the API 1018 to perform shading operations, artificial intelligence operations, or graphics rendering operations. The API 1018 functionality may be typically implemented within the graphics processing unit driver 1022. The graphics processing unit driver 1022 is configured to translate the high-level shading programs into machine code.

The graphics processing system 1002 includes a GPU 1010 (graphics processing unit), an on-chip GPU memory 1016, an on-chip GPU data bus 1032, a GPU local memory 1006, and a GPU data bus 1034. The GPU 1010 is configured to communicate with the on-chip GPU memory 1016 via the on-chip GPU data bus 1032 and with the GPU local memory 1006 via the GPU data bus 1034. The GPU data bus 1034 may utilize one or more of the encoding techniques described herein.

The GPU 1010 may receive instructions transmitted by the CPU 1026 and store results in the GPU local memory 1006. Subsequently, if the instructions were graphics instructions, the GPU 1010 may display certain graphic images stored in the GPU local memory 1006 on the display devices 1028.

The GPU 1010 includes one or more logic blocks 1014. The operation of the logic blocks 1014 may implement embodiments of the encoding schemes described herein. The logic blocks 1014 may be loaded on the GPU as instructions or may be implemented in circuitry as instruction set architecture features, or a combination of both of these.

The GPU 1010 may be provided with any amount of on-chip GPU memory 1016 and GPU local memory 1006, including none, and may employ on-chip GPU memory 1016, GPU local memory 1006, and system memory 1004 in any combination for memory operations. The data/instruction busses between these memories and the GPU 1010 may utilize one or more of the encoding techniques described herein.

The on-chip GPU memory 1016 is configured to include GPU programming 1020 and on-Chip Buffers 1024. The GPU programming 1020 may be transmitted from the graphics processing unit driver 1022 to the on-chip GPU memory 1016 via the system data bus 1036. The system data bus 1036 may utilize one or more of the encoding techniques described herein.

By way of example, the GPU programming 1020 may include a machine code vertex shading program, a machine code geometry shading program, a machine code fragment shading program, an artificial intelligence program, or any number of variations of each. The on-Chip Buffers 1024 are typically employed to store data that requires fast access to reduce the latency of such operations.

The GPU local memory 1006 typically includes less expensive off-chip dynamic random access memory (DRAM) and is also employed to store data and programming employed by the GPU 1010. As shown, the GPU local memory 1006 includes a frame buffer 1008. The frame buffer 1008 stores data for at least one two-dimensional surface that may be employed to drive the display devices 1028. Furthermore, the frame buffer 1008 may include more than one two-dimensional surface so that the GPU 1010 can render to one two-dimensional surface while a second two-dimensional surface is employed to drive the display devices 1028.

The display devices 1028 are one or more output devices capable of emitting a visual image corresponding to an input data signal. For example, a display device may be built using a cathode ray tube (CRT) monitor, a liquid crystal display, or any other suitable display system. The input data signals to the display devices 1028 are typically generated by scanning out the contents of one or more frames of image data that is stored in the frame buffer 1008.

The specific voltages, amperages, and other details described above are for illustrative purposes only. The invention may be practiced using a variety of specific voltage levels, currents, resistances, and so forth. And while the invention has been described above in the context of e.g. a processor transmitting data to a memory, the PAM-4 etc. signaling techniques described herein may be practiced in any of a wide variety of signaling systems in which data is sent from a transmitting device to a receiving device, or between transceiving devices, and so forth.

Terms used herein should be accorded their ordinary meaning in the relevant arts, or the meaning indicated by their use in context, but if an express definition is provided, that meaning controls.

"Logic" herein refers to machine memory circuits, non-transitory machine-readable media, and/or circuitry that by way of its material and/or material-energy configuration comprising control and/or procedural signals, and/or settings and values (such as resistance, impedance, capacitance, inductance, current/voltage ratings, etc.), that may be applied to influence the operation of a device. Electronic circuits such as controllers, field programmable gate arrays, processors, and memory (both volatile and nonvolatile) comprising processor-executable instructions, are examples of logic. Logic specifically excludes pure signals or software per se (however does not exclude machine memories comprising software and thereby forming configurations of matter).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will appreciate that logic may be distributed throughout one or more devices or components, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method of encoding a series of data bits onto a serial data bus, the method comprising:
   determining if (a) a first four-level symbol for a first sequence of two bits of the series of data bits is at a first voltage level of a Pulse Amplitude Modulation 4 Level (PAM-4) encoding, wherein the first voltage level is one of a highest of four voltage levels of the PAM-4 encoding and a lowest of the four voltage levels of the PAM-4 encoding;
   determining if (b) a second four-level symbol for a second sequence of two bits of the series of data bits immediately following the first sequence of two bits is at a second voltage level of the PAM-4 encoding different than the first voltage level, wherein the second voltage level is one of the highest voltage level used by the PAM-4 encoding and the lowest voltage level used by the PAM-4 encoding; and
   on condition that (a) and (b) are both true, encoding a two-level bridge symbol between the first four-level symbol and the second four-level symbol on a data lane of the serial data bus.

2. The method of claim 1, wherein the first four-level symbol is at the highest voltage level of the PAM-4 encoding, and the second four-level symbol is at the lowest voltage level of the PAM-4 encoding, the two-level bridge symbol being a higher of two middle voltage levels of the PAM-4 encoding.

3. The method of claim 1, wherein the first four-level symbol is at the highest voltage level of the PAM-4 encoding, and the second four-level symbol is at the lowest voltage level of the PAM-4 encoding, the two-level bridge symbol being a lower of two middle voltage levels of the PAM-4 encoding.

4. The method of claim 1, wherein the first four-level symbol is at the lowest voltage level of the PAM-4 encoding, and the second four-level symbol is at the highest voltage level of the PAM-4 encoding, the two-level bridge symbol being a higher of two middle voltage levels of the PAM-4 encoding.

5. The method of claim 1, wherein the first four-level symbol is at the lowest voltage level of the PAM-4 encoding, and the second four-level symbol is at the highest voltage level of the PAM-4 encoding, the two-level bridge symbol being a lower of two middle voltage levels of the PAM-4 encoding.

6. An encoder comprising:
an interface to a serial data bus; and
logic to encode a two-level bridge symbol between a first four-level symbol and a second four-level symbol on a data lane of the serial data bus on condition that the first four level symbol and the second four-level symbol are at different extreme voltage levels of a Pulse Amplitude Modulation 4 Level (PAM-4) encoding, wherein an extreme voltage level is one of $0\Delta V$ and $3\Delta V$.

7. The encoder of claim 6, wherein the first four-level symbol is at a highest voltage level of the PAM-4 encoding, and the second four-level symbol is at a lowest voltage level of the PAM-4 encoding, the two-level bridge symbol being a higher of two middle voltage levels ($1\Delta V$ and $2\Delta V$) of the PAM-4 encoding.

8. The encoder of claim 6, wherein the first four-level symbol is at a highest voltage level of the PAM-4 encoding, and the second four-level symbol is at a lowest voltage level of the PAM-4 encoding, the two-level bridge symbol being a lower of two middle voltage levels ($1\Delta V$ and $2\Delta V$) of the PAM-4 encoding.

9. The encoder of claim 6, wherein the first four-level symbol is at a lowest voltage level of the PAM-4 encoding, and the second four-level symbol is at a highest voltage level of the PAM-4 encoding, the two-level bridge symbol being a higher of two middle voltage levels ($1\Delta V$ and $2\Delta V$) of the PAM-4 encoding.

10. The encoder of claim 6, wherein the first four-level symbol is at a lowest voltage level of the PAM-4 encoding, and the second four-level symbol is at a highest voltage level of the PAM-4 encoding, the two-level bridge symbol being a lower of two middle voltage levels ($1\Delta V$ and $2\Delta V$) of the PAM-4 encoding.

11. An encoder for a serial data bus, the encoder comprising:
an interface to a serial data bus; and
encoding logic configured to encode a two-level bridge symbol between a first four-level symbol and a second four-level symbol on a data lane of the serial data bus on condition that an encoding of first four-level symbol and an encoding of the second four-level symbol differ from one another by more than one voltage level of four voltage levels used in a Pulse Amplitude Modulation 4 Level (PAM-4) encoding.

12. The encoder of claim 11, the encoding logic configured to encode the two-level bridge symbol between the first four-level symbol and the second four-level symbol on condition that the first four-level symbol and the second four-level symbol are separated by exactly three voltage levels of the PAM-4 encoding.

13. The encoder of claim 11, the encoding logic configured to encode the two-level bridge symbol at a voltage level selected based on a voltage level of the second four-level symbol.

14. The encoder of claim 11, wherein the first four-level symbol is at a highest voltage level of the PAM-4 encoding, and the second four-level symbol is at a lowest voltage level of the PAM-4 encoding, the two-level bridge symbol being a higher of two middle voltage levels of the PAM-4 encoding.

15. The encoder of claim 11, wherein the first four-level symbol is at a lowest voltage level of the PAM-4 encoding, and the second four-level symbol is at a highest voltage level of the PAM-4 encoding, the two-level bridge symbol being a lower of two middle voltage levels of the PAM-4 encoding.

16. A method of encoding a series of data bits onto a serial data bus, the method comprising:
receiving five sequential bits of the series of data bits; and
encoding a two-level bridge symbol for a third bit of the series of data bits between a first four-level symbol for a first two bits of the series of data bits and a second four-level symbol for a last two bits of the series of data bits on a data lane of the serial data bus on condition that an encoding of the first four-level symbol and an encoding of the second four-level symbol differ from one another by more than one voltage level of four voltage levels used in a Pulse Amplitude Modulation 4 Level (PAM-4) encoding.

17. The method of claim 16, further comprising encoding the two-level bridge symbol between the first four-level symbol and the second four-level symbol on condition that the first four level symbol and the second four-level symbol are separated by exactly three voltage levels of the PAM-4 encoding.

18. The method of claim 16, further comprising encoding the two-level bridge symbol at a voltage level selected based on a voltage level of the second four-level symbol.

19. The method of claim 16, wherein the first four-level symbol is at a highest voltage level of the PAM-4 encoding, and the second four-level symbol is at a lowest voltage level of the PAM-4 encoding, the two-level bridge symbol being a higher of two middle voltage levels of the PAM-4 encoding.

20. The method of claim 16, wherein the first four-level symbol is at a lowest voltage level of the PAM-4 encoding, and the second four-level symbol is at a highest voltage level of the PAM-4 encoding, the two-level bridge symbol being a lower of two middle voltage levels of the PAM-4 encoding.

* * * * *